US012335860B2

(12) United States Patent
Feltrin et al.

(10) Patent No.: US 12,335,860 B2
(45) Date of Patent: Jun. 17, 2025

(54) CELL RESELECTION IN LTE-M STANDALONE CELLS

(71) Applicant: Telefonaktiebolaget LM Ericsson (PUBL), Stockholm (SE)

(72) Inventors: Luca Feltrin, Solna (SE); Tuomas Tirronen, Helsinki (FI); Emre Yavuz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 388 days.

(21) Appl. No.: 17/634,915

(22) PCT Filed: Aug. 15, 2020

(86) PCT No.: PCT/SE2020/050791
§ 371 (c)(1),
(2) Date: Feb. 11, 2022

(87) PCT Pub. No.: WO2021/029821
PCT Pub. Date: Feb. 18, 2021

(65) Prior Publication Data
US 2022/0338116 A1    Oct. 20, 2022

Related U.S. Application Data

(60) Provisional application No. 62/887,180, filed on Aug. 15, 2019.

(51) Int. Cl.
*H04W 48/20* (2009.01)
*H04W 16/26* (2009.01)
(52) U.S. Cl.
CPC ........... *H04W 48/20* (2013.01); *H04W 16/26* (2013.01)

(58) Field of Classification Search
CPC .............................. H04M 1/006; H04W 16/26
(Continued)

(56) References Cited

U.S. PATENT DOCUMENTS

2018/0176847 A1*  6/2018  Fasil Abdul .......... H04L 1/1896
2018/0376484 A1*  12/2018  Beale .................... H04W 24/10

FOREIGN PATENT DOCUMENTS

| WO | 2016 070387 A1 | 5/2016 |
| WO | 2016 144099 A1 | 9/2016 |
| WO | 2019 095162 A1 | 5/2019 |

OTHER PUBLICATIONS

3GPP TS 36.304 v15.4.0; Technical Specification; 3rd Generation Partnership Project; Technical Specification Group Radio Access Network; Evolved Universal Terrestrial Radio Access (E-UTRA); User Equipment (UE) procedures in idle mode (Release 15)—Jun. 2019.

(Continued)

*Primary Examiner* — Kiet M Doan
(74) *Attorney, Agent, or Firm* — Sage Patent Group

(57) ABSTRACT

A method for cell reselection by a non-Bandwidth reduced Low complexity (non-BL) wireless device camped in a standalone-cell providing enhanced coverage to the wireless device. The method includes determining, based on a respective signal strength of each of a plurality of cells, a first ranking of the plurality of cells. The plurality of cells include at least the standalone cell and a target cell. While the non-BL wireless device is camped in the standalone cell with enhanced coverage, the non-BL wireless device determines that at least one criteria is met for a cell reselection from the standalone cell to the target cell offering normal coverage to the non-BL wireless device. The non-BL wireless device selects the target cell to camp in whether or not the target cell ranks higher than the standalone cell in the first ranking.

5 Claims, 16 Drawing Sheets

(58) Field of Classification Search
USPC .......................................... 455/62; 370/230
See application file for complete search history.

(56) References Cited

OTHER PUBLICATIONS

3GPP TSG-RAN WG2 Meeting #106; Reno, Nevada; Agenda Item: 12.1.9; Source: Huawei, HiSilicon; Title: Use of LTE Control Channel Region for DL transmission (R2-1907028)—May 13-17, 2019.
3GPP TSG RAN Meeting #83; Shenzhen, China; Source: Ericsson; Title: Revised WID; Additional MTC enhancements for LTE; Agenda Item: 10.3.1 (RP-190770)—Mar. 18-21, 2019.
PCT International Search Report issued for International application No. PCT/SE2020/050791—Jan. 18, 2021.
PCT Written Opinion of the International Searching Authority issued for International application No. PCT/SE2020/050791—Jan. 18, 2021.

* cited by examiner

CELL RESELECTION IN LTE-M STANDALONE CELLS

PRIORITY

This nonprovisional application is a U.S. National Stage Filing under 35 U.S.C. § 371 of International Patent Application Serial No. PCT/SE2020/050791 filed Aug. 15, 2020 and entitled "Cell Reselection in LTE-M Standalone Cells" which claims priority to U.S. Provisional Patent Application No. 62/887,180 filed Aug. 15, 2019 both of which are hereby incorporated by reference in their entirety.

TECHNICAL FIELD

The present disclosure relates, in general, to wireless communications and, more particularly, systems and methods for cell reselection in Long Term Evolution for Machines (LTE-M) standalone cells.

BACKGROUND

This disclosure pertains to early data transmission, Long Term Evolution for Machines (LTE-M), Narrowband-Internet of Things (NB-IoT), mobile-terminated data, signalling reductions, and/or power consumption saving. The Release 16 work item description (WID) (RP-190770, Additional MTC enhancements for Long Term Evolution (LTE), Ericsson, Shenzhen, China, March 2019) include the following objective for LTE-M enhancement: Enable the use of LTE control channel region for downlink (DL) transmission (Machine-Type Communications Physical Downlink Control Channel (MPDCCH)/Physical Downlink Shared Channel (PDSCH)) to Bandwidth reduced Low complexity (BL)/Coverage Enhancement (CE) User Equipment (UEs) [Radio Access Network 1 (RAN1), RAN2, RAN4]. This deployment mode should support legacy operation for legacy BL/CE UEs.

A cell where this feature is supported may be referred to as a "standalone cell" or a "standalone LTE-M cell." An objective is to allow BL UEs and UEs supporting CE to be able to camp in this cell where a control region of each subframe can be used for user data transmission. In legacy systems, a control region is reserved for LTE physical channels, such as the Physical Downlink Control Channel (PDCCH), spreading over LTE-M narrowbands. In a standalone cell, there may be no PDCCH transmission.

In a standalone cell, only System Information Block 1-Bandwidth Reduced (SIB1-BR) is broadcasted in certain instances. It may be the case that no SIB1 transmission is made. This would prevent UEs not capable of CE to camp in such cell due to barring. The details of this feature are currently discussed in 3$^{rd}$ Generation Partnership Project (3GPP) Rel-16.

S-criterion and the cell reselection procedure are described in 3GPP TS 36.304. The S-criterion is applied to any cell to determine if the UE can camp in the cell, including in which enhanced coverage level, if supported in the cell. The UE compares the Reference Signal Received Power (RSRP) and Reference Signal Received Quality (RSRQ) with some thresholds provided in SIB1/SIB1-BR broadcasted in the cell and determines if camping is possible and in case it is in enhanced coverage, which level to trigger random access when needed (if the UE is capable).

The cell reselection procedure is performed by the UE to determine whether it should move to a neighbor cell or stay in the current serving cell. For each neighbor cell that fulfills the S-criterion (in any coverage extension mode) a rank based on the RSRP and several configurable offsets is computed. The UE reselects the cell with the highest rank.

The rank is computed according to the formulas below, where $R_s$ is the rank of the serving cell, $R_n$ is the rank of any other neighbor cell and $Q_{meas}$ is the measured RSRP $$R_s = Q_{meas,s} + Q_{Hyst} - Q\text{offset}_{temp} + Q\text{offset}_{SCPTM}$$

$$R_n = Q_{meas,n} - Q\text{offset} - Q\text{offset}_{temp} + Q\text{offset}_{SCPTM}$$

Notice that $Q_{Hyst}$ is a hysteresis term that makes it more difficult for the UE to leave the serving cell. In this way, a UE close to the transition region may be prevented from continuously changing cells due to fluctuations of the RSRP (e.g., to avoid ping pong behavior between cells).

For simplicity, this disclosure ignores the offsets and assumes $R_s$ and $R_n$ follow the trend expressed in FIG. 1. Also, by ensuring that all proposed embodiments are "symmetrical" (e.g., all the UE that moves in one direction are not affected by ping-pong), the effect of the hysteresis term $Q_{Hyst}$ is left as is.

There currently exist certain challenge(s). In some deployments, a neighbor (normal) cell may have a lower rank with respect to a standalone cell although S-criterion for normal coverage is fulfilled. The cell reselection algorithm may force the UE to camp in the standalone cell instead of camping in the neighboring cell in normal coverage. This means that some functionality may be restricted for UEs camping in a standalone cell compared to when camping in a "normal" coverage cell. For example, this feature could be broadcast/multicast in idle mode if only supported in "normal" coverage. As another example, some functionality in connected mode may be unavailable unless the network commands the UE to handover to the neighboring cell in "normal" coverage. Note that keeping the UE in a standalone cell when in connected mode may require more network resources over the air for transmission in the uplink (UL)/downlink (DL) if a neighboring cell is available where UE can be in "normal" coverage in connected mode.

FIG. 1 represents an example scenario demonstrating problematic deployment and cell ranks for reselection process. In the graph, the ranks used for the cell reselection algorithm are shown ($R_s$ in green, $R_n$ in blue) as a function of UE position. The UE starts from camping in the standalone cell (left).

In region 1 (left), the rank of the camped cell (e.g., standalone cell), is higher than the one for the neighboring cell, so the UE does not reselect the neighbor cell. Assuming that in region 1, the UE would be in enhanced coverage if it were to perform cell reselection to the neighbor cell, and thus current, mechanism for ranking would be sufficient.

In region 2 (center), the rank of the camped cell (e.g., standalone cell), is still higher than the one for neighboring cell, so the UE does not perform cell reselection. Nevertheless, the UE may benefit from performing cell reselection to the neighboring cell if it would be in normal coverage even though the UE is required to be camped in the standalone cell based on the ranking mechanism.

In region 3 (right), the rank of the neighboring cell becomes higher than the one of the camped cell, so the UE performs cell reselection.

Other configurations are possible in terms of absolute value of both $R_s$ and $R_n$. In some scenarios, region 2 might be absent.

SUMMARY

Certain aspects of the present disclosure and their embodiments may provide solutions to these or other challenges. According to certain embodiments, a mechanism is provided for cell reselection procedure that enables a non-Bandwidth reduced Low complexity (non-BL) wireless device to camp in a cell (e.g., non-standalone) even though the best cell to camp, based on ranking criteria, is a standalone cell. According to certain embodiments, an offset or other algorithm change is provided to enable non-BL wireless devices to camp in normal coverage cells.

According to certain embodiments, a method is provided for cell reselection by a non-BL wireless device camped in a standalone-cell providing enhanced coverage to the wireless device. The method includes determining, based on a respective signal strength of each of a plurality of cells, a first ranking of the plurality of cells. The plurality of cells include at least the standalone cell and a target cell. While the non-BL wireless device is camped in the standalone cell with enhanced coverage, the non-BL wireless device determines that at least one criteria is met for a cell reselection from the standalone cell to the target cell offering normal coverage to the non-BL wireless device. The non-BL wireless device selects the target cell to camp in whether or not the target cell ranks higher than the standalone cell in the first ranking.

According to certain embodiments, a non-BL wireless device camped in a standalone-cell providing enhanced coverage to the non-BL wireless device includes processing circuitry configured to determine, based on a respective signal strength of each of a plurality of cells, a first ranking of the plurality of cells. The plurality of cells include at least the standalone cell and a target cell. While the non-BL wireless device is camped in the standalone cell with enhanced coverage, the processing circuitry is configured to determine that at least one criteria is met for a cell reselection from the standalone cell to the target cell offering normal coverage to the non-BL wireless device. The processing circuitry is configured to select the target cell to camp in whether or not the target cell ranks higher than the standalone cell in the first ranking.

According to certain embodiments, a method is provided by a network node serving a non-BL wireless device with extended coverage in a standalone cell. The method includes transmitting, to the non-BL wireless device, a signal comprising at least one offset to be applied when ranking a plurality of cells for selecting a cell to camp in. The plurality of cells include the standalone cell in which the non-BL wireless device is camped with extended coverage and a target cell offering normal coverage to the non-BL wireless device. The at least one offset results in at least one of: increasing a rank of the target cell offering normal coverage to the non-BL wireless device relative to a rank of the standalone cell providing extended coverage, and decreasing the rank of the standalone cell providing extended coverage relative to the rank of the target cell offering normal coverage.

According to certain embodiments, a network node serving a non-BL wireless device with extended coverage in a standalone cell includes processing circuitry configured to transmit, to the non-BL wireless device, a signal comprising at least one offset to be applied when ranking a plurality of cells for selecting a cell to camp in. The plurality of cells include the standalone cell in which the non-BL wireless device is camped with extended coverage and a target cell offering normal coverage to the non-BL wireless device. The at least one offset results in at least one of: increasing a rank of the target cell offering normal coverage to the non-BL wireless device relative to a rank of the standalone cell providing extended coverage, and decreasing the rank of the standalone cell providing extended coverage relative to the rank of the target cell offering normal coverage.

According to certain embodiments, a method for cell reselection includes transmitting, by a network node providing extended coverage to a non-BL wireless device in a standalone cell, a signal comprising at least one offset for determining a ranking of a plurality of cells to camp in. The plurality of cells include the standalone cell in which the non-BL wireless device is camped with extended coverage and a target cell offering normal coverage to the non-BL wireless device. Based on a respective signal strength of each of the plurality of cells, the wireless device determines the ranking of the plurality of cells and applies the at least one offset to: increase a rank of the target cell offering normal coverage relative to a rank of the standalone cell providing extended coverage in the ranking, and/or decrease a rank of the standalone cell providing extended coverage relative to the target cell offering normal coverage in the ranking. Based on the ranking, the wireless device selects the target cell to camp in.

According to certain embodiments, a network system for cell reselection includes a network node and a non-BL wireless device. The network node provides extended coverage to the non-BL wireless device in a standalone cell and includes processing circuitry configured to transmit, to the non-BL wireless device, a signal that includes at least one offset for determining a ranking of a plurality of cells to camp in. The plurality of cells include the standalone cell in which the non-BL wireless device is camped with extended coverage and a target cell offering normal coverage to the non-BL wireless device. The non-BL wireless device includes processing circuitry configured to determine, based on a respective signal strength of each of the plurality of cells, the ranking of the plurality of cells and apply the at least one offset to: increase a rank of the target cell offering normal coverage relative to a rank of the standalone cell providing extended coverage in the ranking, and/or decrease a rank of the standalone cell providing extended coverage relative to the target cell offering normal coverage in the ranking. Based on the ranking, the processing circuitry of the wireless device is configured to select the target cell to camp in.

Certain embodiments may provide one or more of the following technical advantage(s). For example, a technical advantage may be that certain embodiments make it possible for UEs deployed in region 2 of FIG. 1 to use some functionalities supported only in a non-standalone cell in "normal" coverage if camped in such non-standalone cell instead of camping in the standalone cell as required by the current cell reselection procedure. For example, these functionalities could be broadcast/multicast in idle mode if only supported in "normal" coverage or some functionality in connected mode.

As another example, a technical advantage of certain embodiments may be that a non-BL UE is able to camp in a normal cell (e.g., non-standalone cell) even though the best cell to camp, based on ranking criteria, is a standalone cell. Thus, non-BL UEs are better able to move into normal coverage cells and are, therefore, able to use radio resources more efficiently.

As another example, a technical advantage may be that certain embodiments may provide a higher bitrate.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
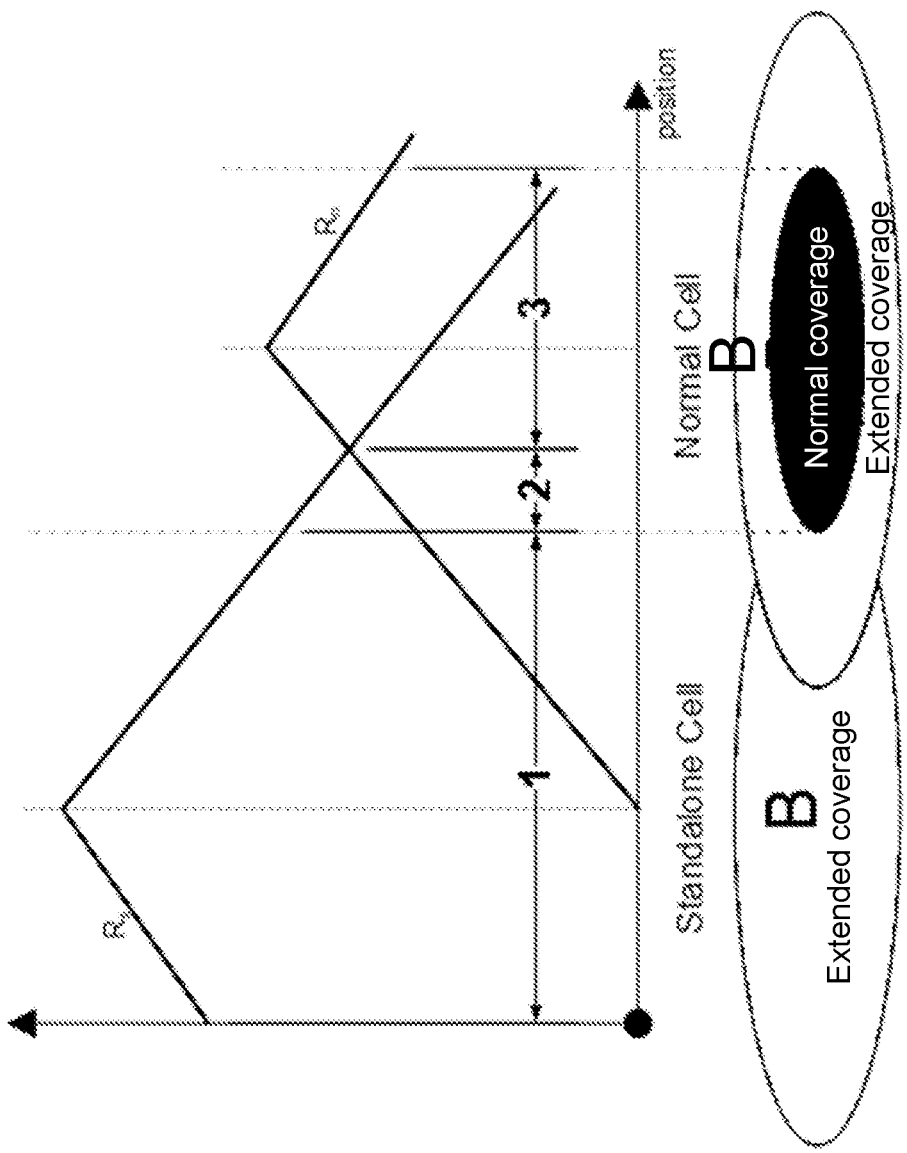
FIG. 1 illustrates an example scenario demonstrating problematic deployment and cell ranks for reselection process.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

All following embodiments, unless otherwise stated, apply to non-Bandwidth reduced Low complexity (non-BL) user equipments (UEs) capable of coverage enhancement (CE). Also, for all embodiments, two mechanisms are mainly considered. One mechanism to allow the UE to perform cell (re)selection from the camped standalone cell, based on ranking criteria, to a neighboring non-standalone cell that supports enhanced coverage, where the UE is expected to camp in normal coverage. A second mechanism to prevent UE from immediately reselecting back to the original cell.

According to certain embodiments, a wireless device or other UE connects to a neighboring cell if a rank for the neighboring cell, which is adjusted by an offset, is higher than a rank for the serving cell. In a particular embodiment, the rank of the neighboring cell is based on Reference Signals Received Power (RSRP) and Reference Signal Received Quality (RSRQ) of the neighboring cell. Likewise, the rank of the serving cell may be based on at least one of RSRP and RSRQ.

For example, in a particular embodiment, a UE camped in a standalone cell may perform cell (re)selection to a non-standalone cell that supports enhanced coverage if the S-Criterion for normal coverage is satisfied in the destination cell. In further particular embodiment, a UE camped in normal coverage in a non-standalone cell ignores all neighboring standalone cells.

As another example, in a particular embodiment, the same behavior in both directions (from standalone to non-standalone and vice versa) is adopted if the S-Criterion for normal coverage is satisfied "within a certain margin." The latter variation of the S-Criterion for normal coverage may be defined such that the cell selection criterion S in normal coverage is fulfilled when:

$$Srxlev > Qrxlevmargin \text{ AND } Squal > Qqualmargin$$

Where Qrxlevmargin and Qqualmargin are new parameters introduced herein and can be either hardcoded in the specifications or signaled in broadcasted System Information (SI).

In another particular embodiment, the UE camped in a standalone cell may calculate $R_n$ according to the formula below for the neighbor cells for which the S-Criterion in normal coverage is satisfied:

$$R_n = Q_{meas,n} - Q\text{offset} - Q\text{offset}_{temp} + Q\text{offset}_{SCPTM} + Q\text{offset}_{NSA}$$

To avoid ping-pong between the newly and previously camped cell, similar adjustment may also be made for non BL UEs camped in a non-standalone cell in normal coverage when calculating the criteria for neighboring standalone cells, such that $R_n$ may be calculated as follows:

$$R_n = Q_{meas,n} - Q\text{offset} - Q\text{offset}_{temp} + Q\text{offset}_{SCPTM} - Q\text{offset}_{SA}$$

In a particular embodiment, the parameters $Q\text{offset}_{NSA}$ and $Q\text{offset}_{SA}$ may be configured via SI broadcast or dedicated signalling when the UE is in connected mode. The offsets may also be different for each neighbor cell and may, therefore, be signalled in the appropriate SI for reselection, or a specific value broadcasted by the serving cell and applied to all the neighboring cells.

In a particular embodiment, only one offset may be specified as $Q\text{offset}_{MTC} = Q\text{offset}_{NSA} = Q\text{offset}_{SA}$ in order to avoid an unbalanced ranking calculation when moving in one direction or the other and to avoid ping-pong effect.

Figure 2A:
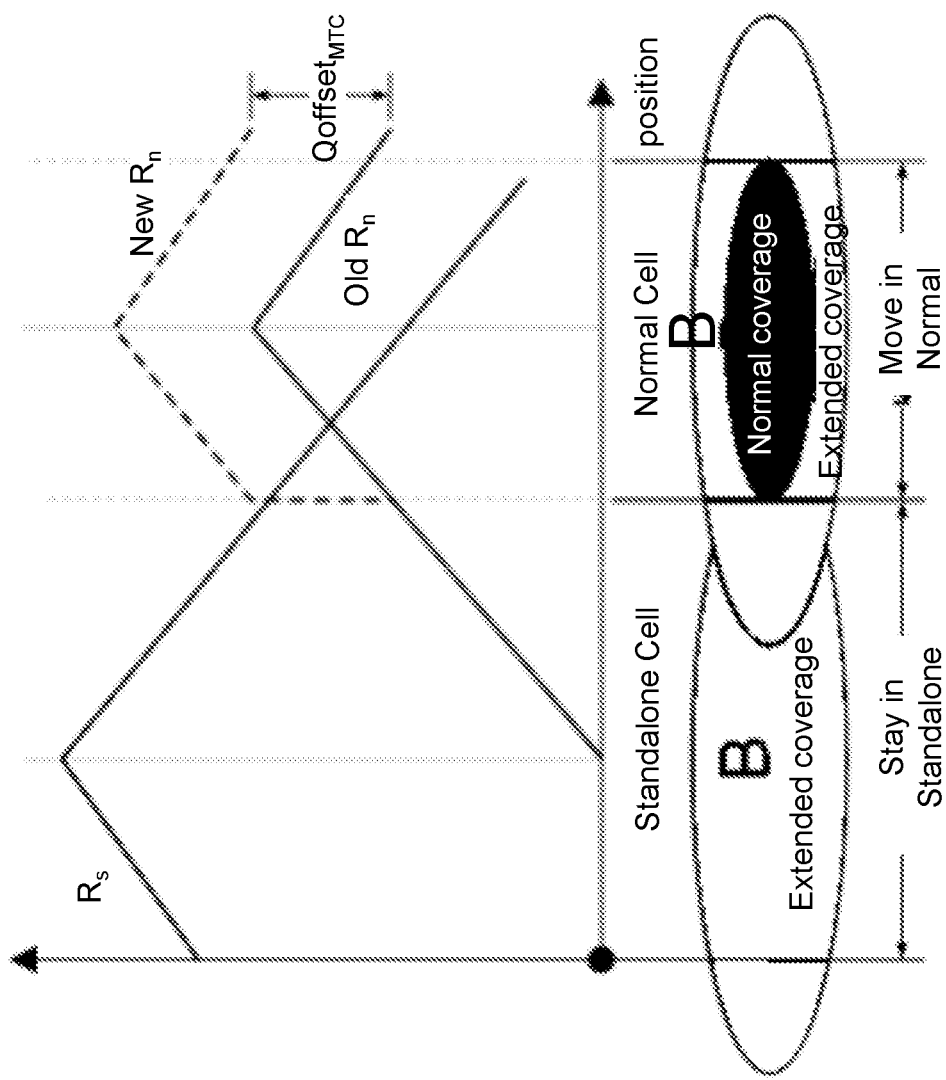
FIGS. 2A and 2B illustrate how the ranking criteria may be impacted by the introduction of an additional new offset value, according to certain embodiments.
Figure 2B:
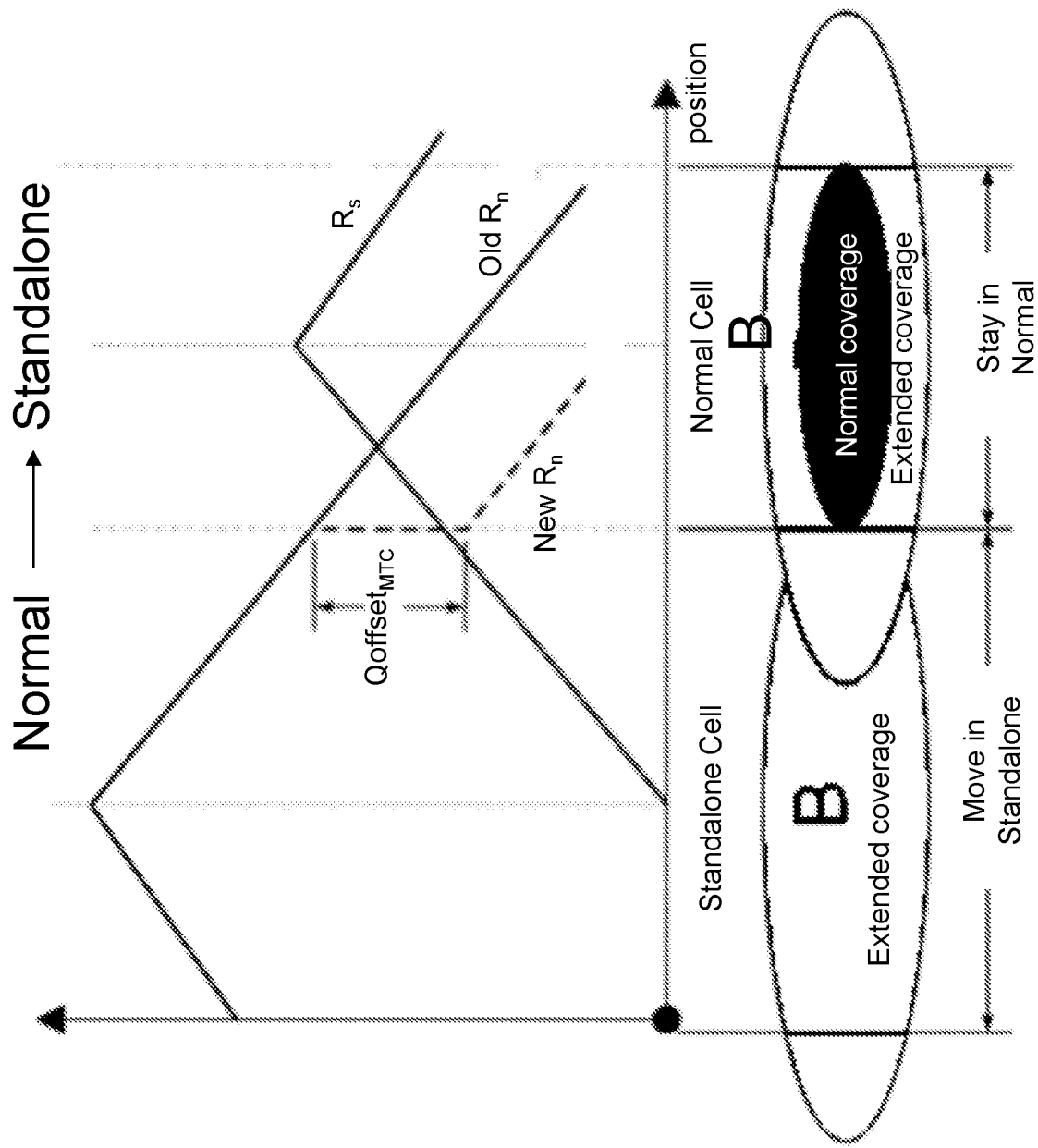

FIGS. 2A and 2B illustrate how the ranking criteria may be impacted by the introduction of an additional new offset value, according to certain embodiments.

In a particular embodiment, the offset may be configured by the mobile network operator (MNO) appropriately to tune the intended UE behavior regarding cell (re)selection.

In another particular embodiment, the UE may apply the aforementioned formulas considering only the UE's current CE mode (normal or enhanced coverage) and the outcome of the S-criterion for the neighbor cell. Specifically, among the set of serving and neighboring cells, the UE chooses to reselect one of the cells for which the S-Criterion for normal coverage is satisfied. Consequently, it is not considered whether the serving or neighbor cell is standalone or not, and the relative signaling can be avoided.

Figure 3:
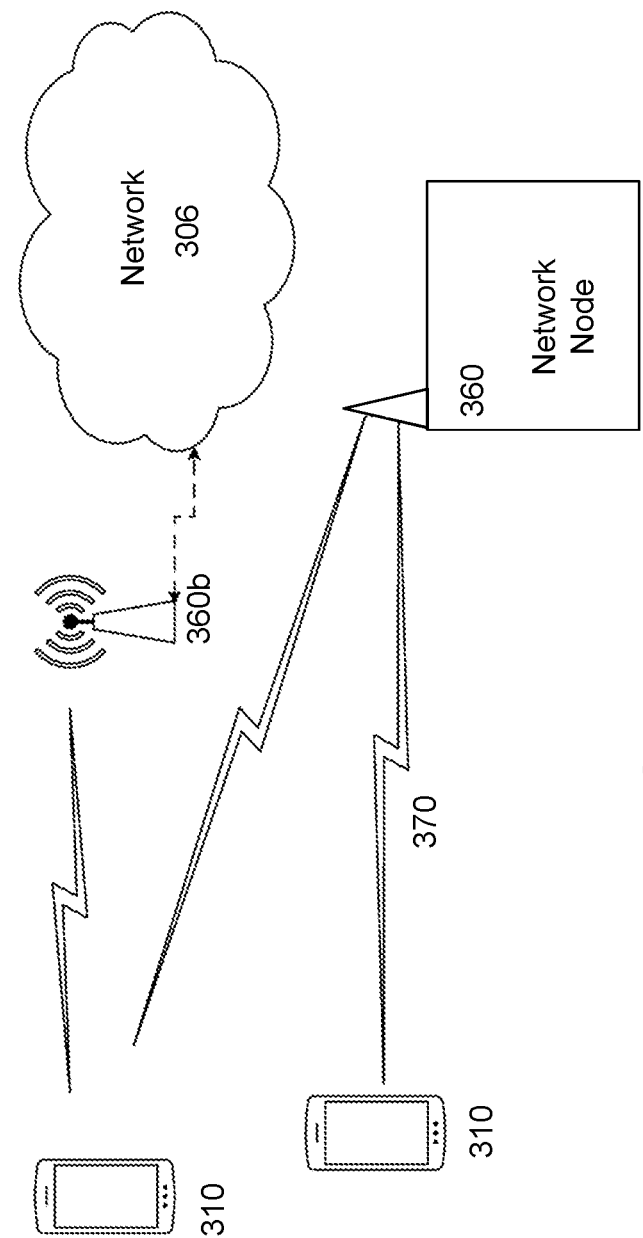
FIG. 3 illustrates an example wireless network, according to certain embodiments.

FIG. 3 illustrates an example wireless network, in accordance with some embodiments.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 306, network nodes 360 and 360b, and wireless devices 310. In practice, a wireless network may further include any additional elements suitable to support communication between wireless devices or between a wireless device and another communication device, such as a landline telephone, a service provider, or any other network node or end device. Of the illustrated components, network node 360 and wireless device 310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 360 and wireless device 310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 4:
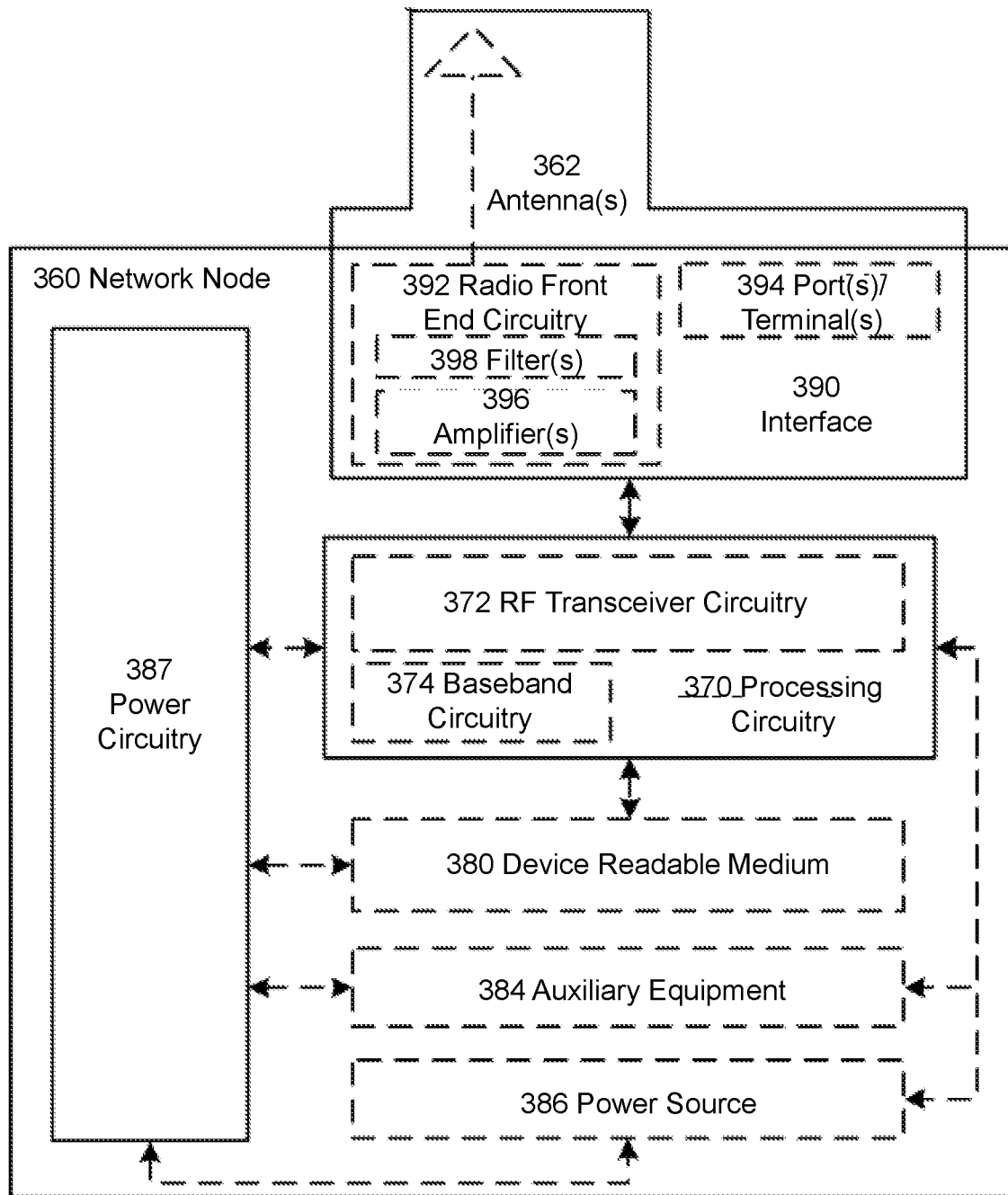
FIG. 4 illustrates an example network node, according to certain embodiments.

FIG. 4 illustrates an example network node 360, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs), and gNode Bs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centres (MSCs), Mobility Management Entities (MMEs)), Operations & Maintenance (O&M) nodes, Operations Support System (OSS) nodes, Self Optimized Network (SON) nodes, positioning nodes (e.g., Evolved-Serving Mobile Location Centres (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 360 includes processing circuitry 370, device readable medium 380, interface 390, auxiliary equipment 384, power source 386, power circuitry 387, and antenna 362. Although network node 360 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules).

Similarly, network node 360 may be composed of multiple physically separate components (e.g., a NodeB component and a RNC component, or a BTS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, Global System for Mobile Communications (GSM), Wide Code Division Multiplexing Access (WCDMA), Long Term Evolution (LTE), New Radio (NR), WiFi, or Bluetooth wireless technologies. These wireless technologies may be integrated into the same or different chip or set of chips and other components within network node 360.

Processing circuitry 370 is configured to perform any determining, calculating, or similar operations (e.g., certain obtaining operations) described herein as being provided by a network node. These operations performed by processing circuitry 370 may include processing information obtained by processing circuitry 370 by, for example, converting the obtained information into other information, comparing the obtained information or converted information to information stored in the network node, and/or performing one or more operations based on the obtained information or converted information, and as a result of said processing making a determination.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units In certain embodiments, some or all of the functionality described herein as being provided by a network node, base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360, but are enjoyed by network node 360 as a whole, and/or by end users and the wireless network generally.

Device readable medium 380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 370. Device readable medium 380 may store any suitable instructions, data or information, including a computer program, software, an application including one or more of logic, rules, code, tables, etc. and/or other instructions capable of being executed by processing circuitry 370 and, utilized by network node 360. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signalling and/or data between network node 360, network 306, and/or wireless devices 310. As illustrated, interface 390 comprises port(s)/terminal(s) 394 to send and receive data, for example to and from network 306 over a wired connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or wireless devices via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 4 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

Figure 5:
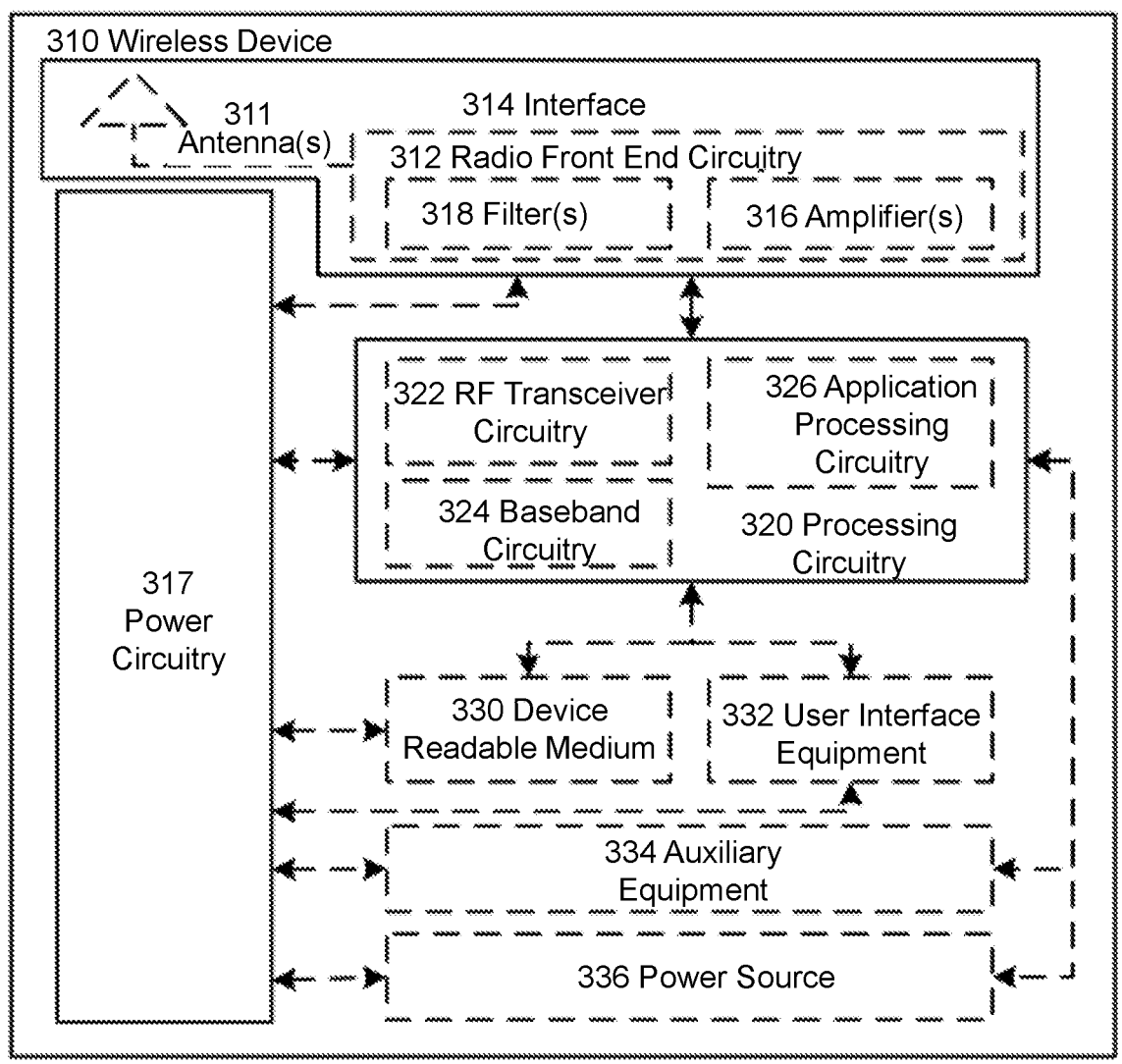
FIG. 5 illustrates an example wireless device, according to certain embodiments.

FIG. 5 illustrates an example wireless device 310, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication (e.g., v2v, v2x), and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 310 includes antenna 311, interface 314, processing circuitry 320, device readable medium 330, user interface equipment 332, auxiliary equipment 334, power source 336 and power circuitry 337. Wireless device 310 may include multiple sets of one or more of the illustrated components for different wireless technologies supported by wireless device 310, such as, for example, GSM, WCDMA, LTE, NR, WiFi, WiMAX, or Bluetooth wireless technologies, just to mention a few. These wireless technologies may be integrated into the same or different chips or set of chips as other components within wireless device 310.

Antenna 311 may include one or more antennas or antenna arrays, configured to send and/or receive wireless signals, and is connected to interface 314. In certain alternative embodiments, antenna 311 may be separate from wireless device 310 and be connectable to wireless device 310 through an interface or port. Antenna 311, interface 314, and/or processing circuitry 320 may be configured to perform any receiving or transmitting operations described herein as being performed by a wireless device. Any information, data and/or signals may be received from a network node and/or another wireless device. In some embodiments, radio front end circuitry and/or antenna 311 may be considered an interface.

As illustrated, interface 314 comprises radio front end circuitry 312 and antenna 311. Radio front end circuitry 312 comprise one or more filters 318 and amplifiers 316. Radio front end circuitry 314 is connected to antenna 311 and processing circuitry 320, and is configured to condition signals communicated between antenna 311 and processing circuitry 320. Radio front end circuitry 312 may be coupled to or a part of antenna 311. In some embodiments, wireless device 310 may not include separate radio front end circuitry 312; rather, processing circuitry 320 may comprise radio front end circuitry and may be connected to antenna 311. Similarly, in some embodiments, some or all of RF transceiver circuitry 322 may be considered a part of interface 314. Radio front end circuitry 312 may receive digital data that is to be sent out to other network nodes or wireless devices via a wireless connection. Radio front end circuitry 312 may convert the digital data into a radio signal having the appropriate channel and bandwidth parameters using a combination of filters 318 and/or amplifiers 316. The radio signal may then be transmitted via antenna 311. Similarly, when receiving data, antenna 311 may collect radio signals which are then converted into digital data by radio front end circuitry 312. The digital data may be passed to processing circuitry 320. In other embodiments, the interface may comprise different components and/or different combinations of components.

Processing circuitry 320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 310 components, such as device readable medium 330, wireless device 310 functionality. Such functionality may include providing any of the various wireless features or benefits discussed herein. For example, processing circuitry 320 may execute instructions stored in device readable medium 330 or in memory within processing circuitry 320 to provide the functionality disclosed herein.

As illustrated, processing circuitry 320 includes one or more of RF transceiver circuitry 322, baseband processing circuitry 324, and application processing circuitry 326. In other embodiments, the processing circuitry may comprise different components and/or different combinations of components. In certain embodiments processing circuitry 320 of wireless device 310 may comprise a SOC. In some embodiments, RF transceiver circuitry 322, baseband processing circuitry 324, and application processing circuitry 326 may be on separate chips or sets of chips. In alternative embodiments, part or all of baseband processing circuitry 324 and application processing circuitry 326 may be combined into one chip or set of chips, and RF transceiver circuitry 322 may be on a separate chip or set of chips. In still alternative embodiments, part or all of RF transceiver circuitry 322 and baseband processing circuitry 324 may be on the same chip or set of chips, and application processing circuitry 326 may be on a separate chip or set of chips. In yet other alternative embodiments, part or all of RF transceiver circuitry 322, baseband processing circuitry 324, and application processing circuitry 326 may be combined in the same chip or set of chips. In some embodiments, RF transceiver circuitry 322 may be a part of interface 314. RF transceiver circuitry 322 may condition RF signals for processing circuitry 320.

In certain embodiments, some or all of the functionality described herein as being performed by a wireless device may be provided by processing circuitry 320 executing instructions stored on device readable medium 330, which in certain embodiments may be a computer-readable storage medium. In alternative embodiments, some or all of the functionality may be provided by processing circuitry 320 without executing instructions stored on a separate or discrete device readable storage medium, such as in a hardwired manner. In any of those particular embodiments, whether executing instructions stored on a device readable storage medium or not, processing circuitry 320 can be configured to perform the described functionality. The benefits provided by such functionality are not limited to processing circuitry 320 alone or to other components of wireless device 310, but are enjoyed by wireless device 310 as a whole, and/or by end users and the wireless network generally.

Processing circuitry 320 may be configured to perform any determining, calculating, or similar operations (e.g., certain obtaining operations) described herein as being performed by a wireless device. These operations, as performed by processing circuitry 320, may include processing information obtained by processing circuitry 320 by, for example, converting the obtained information into other information, comparing the obtained information or converted information to information stored by wireless device 310, and/or performing one or more operations based on the obtained information or converted information, and as a result of said processing making a determination.

Device readable medium 330 may be operable to store a computer program, software, an application including one or more of logic, rules, code, tables, etc. and/or other instructions capable of being executed by processing circuitry 320. Device readable medium 330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 320. In some embodiments, processing circuitry 320 and device readable medium 330 may be considered to be integrated.

User interface equipment 332 may provide components that allow for a human user to interact with wireless device 310. Such interaction may be of many forms, such as visual, audial, tactile, etc. User interface equipment 332 may be operable to produce output to the user and to allow the user to provide input to wireless device 310. The type of interaction may vary depending on the type of user interface equipment 332 installed in wireless device 310. For example, if wireless device 310 is a smart phone, the interaction may be via a touch screen; if wireless device 310 is a smart meter, the interaction may be through a screen that provides usage (e.g., the number of gallons used) or a speaker that provides an audible alert (e.g., if smoke is detected). User interface equipment 332 may include input interfaces, devices and circuits, and output interfaces, devices and circuits. User interface equipment 332 is configured to allow input of information into wireless device 310, and is connected to processing circuitry 320 to allow processing circuitry 320 to process the input information. User interface equipment 332 may include, for example, a microphone, a proximity or other sensor, keys/buttons, a touch display, one or more cameras, a USB port, or other input circuitry. User interface equipment 332 is also configured to allow output of information from wireless device 310, and to allow processing circuitry 320 to output information from wireless device 310. User interface equipment 332 may include, for example, a speaker, a display, vibrating circuitry, a USB port, a headphone interface, or other output circuitry. Using one or more input and output interfaces, devices, and circuits, of user interface equipment 332, wireless device 310 may communicate with end users and/or the wireless network, and allow them to benefit from the functionality described herein.

Auxiliary equipment 334 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 334 may vary depending on the embodiment and/or scenario.

Power source 336 may, in some embodiments, be in the form of a battery or battery pack. Other types of power sources, such as an external power source (e.g., an electricity outlet), photovoltaic devices or power cells, may also be used. Wireless device 310 may further comprise power circuitry 337 for delivering power from power source 336 to the various parts of wireless device 310 which need power from power source 336 to carry out any functionality described or indicated herein. Power circuitry 337 may in certain embodiments comprise power management circuitry. Power circuitry 337 may additionally or alternatively be operable to receive power from an external power source; in which case wireless device 310 may be connectable to the external power source (such as an electricity outlet) via input circuitry or an interface such as an electrical power cable. Power circuitry 337 may also in certain embodiments be operable to deliver power from an external power source to power source 336. This may be, for example, for the charging of power source 336. Power circuitry 337 may perform any formatting, converting, or other modification to the power from power source 336 to make the power suitable for the respective components of wireless device 310 to which power is supplied.

Figure 6:
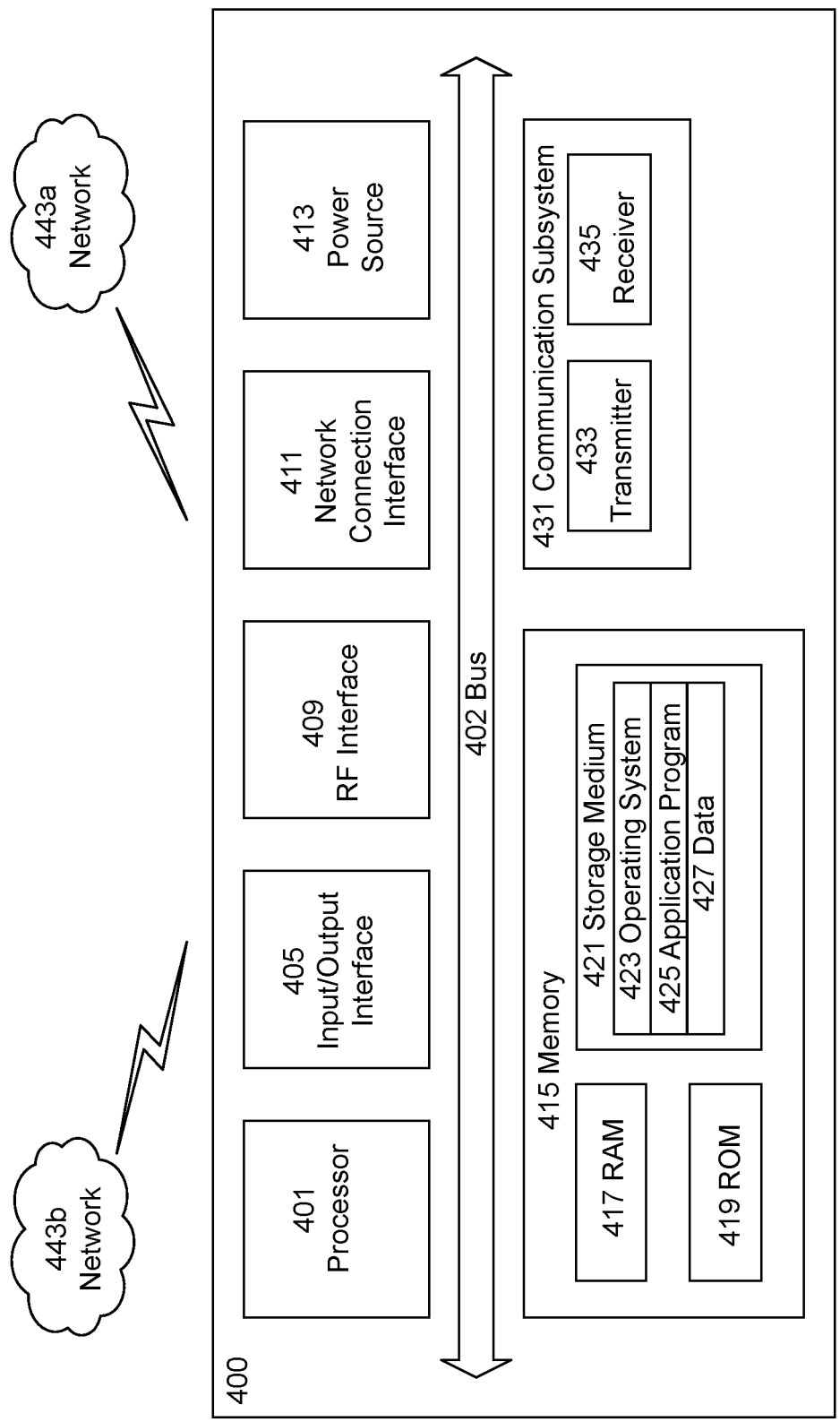
FIG. 6 illustrate an example user equipment, according to certain embodiments.

FIG. 6 illustrates one embodiment of a UE 400, in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the $3^{rd}$ Generation Partnership Project (3GPP), including a NB-IoT UE that is not intended for sale to, or operation by, a human user. UE 400, as illustrated in FIG. 6, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 6 is a UE, the components discussed herein are equally applicable to a wireless device, and vice-versa.

In FIG. 6, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 409 may be configured to provide a communication interface to RF components such as a transmitter, a receiver, and an antenna. Network connection interface 411 may be configured to provide a communication interface to network 443a. Network 443a may encompass wired and/or wireless networks such as a local-area network (LAN), a wide-area network (WAN), a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 6, processing circuitry 401 may be configured to communicate with network 443b using communication subsystem 431. Network 443a and network 443b may be the same network or networks or different network or networks. Communication subsystem 431 may be configured to include one or more transceivers used to communicate with network 443b. For example, communication subsystem 431 may be configured to include one or more transceivers used to communicate with one or more remote transceivers of another device capable of wireless communication such as another wireless device, UE, or base station of a radio access network (RAN) according to one or more communication protocols, such as IEEE 802.4, CDMA, WCDMA, GSM, LTE, Universal Terrestrial Radio Access Network (UTRAN), WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443b may encompass wired and/or wireless networks such as a local-area network (LAN), a wide-area network (WAN), a computer network, a wireless network, a telecommunications network, another like network or any combination thereof. For example, network 443b may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 7:
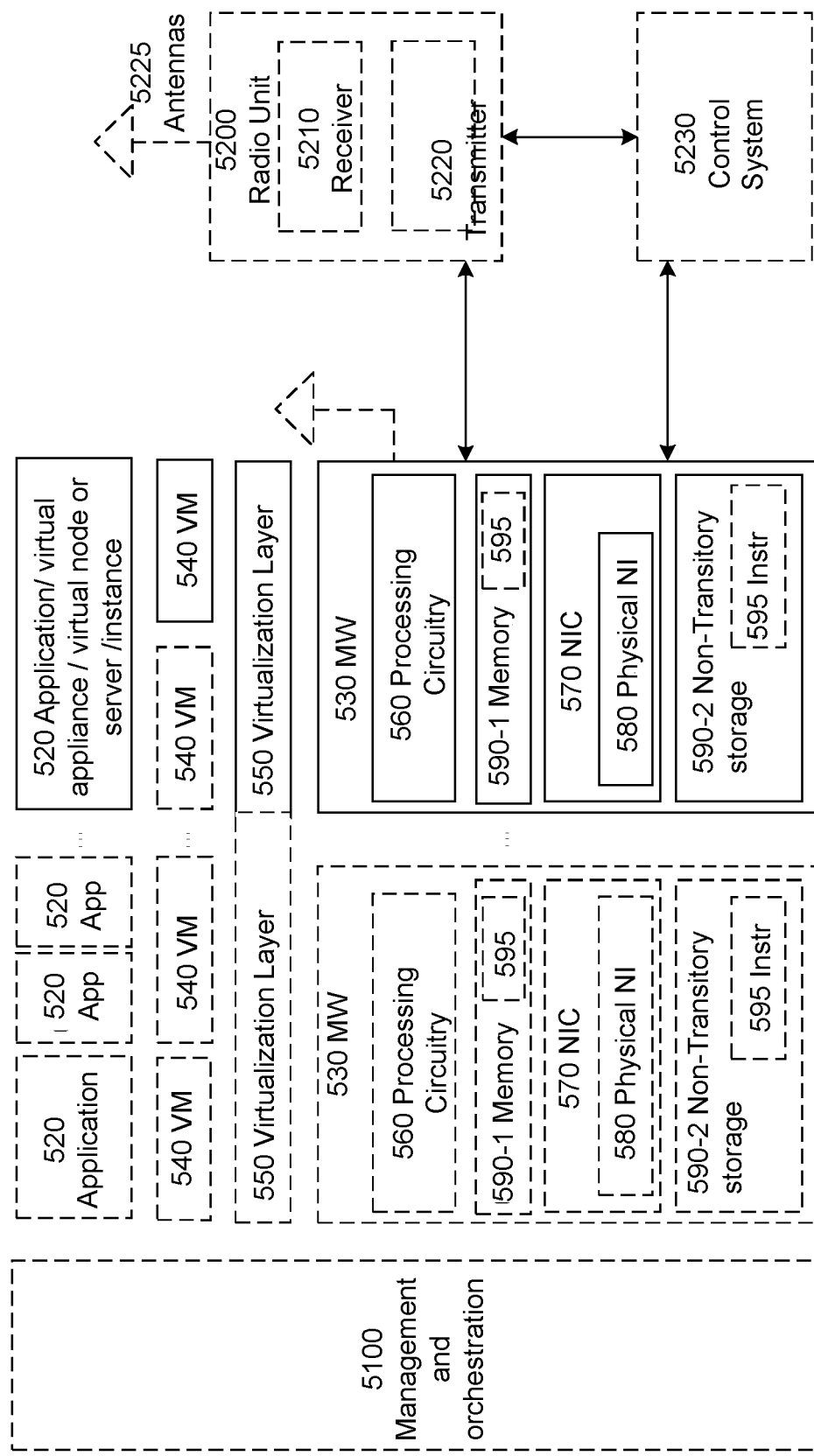
FIG. 7 illustrates a virtualization environment in which functions implemented by some embodiments may be virtualized, according to certain embodiments.

FIG. 7 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 7, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 7.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signalling can be effected with the use of control system 5230 which may alternatively be used for communication between the hardware nodes 530 and radio units 5200.

Figure 8:
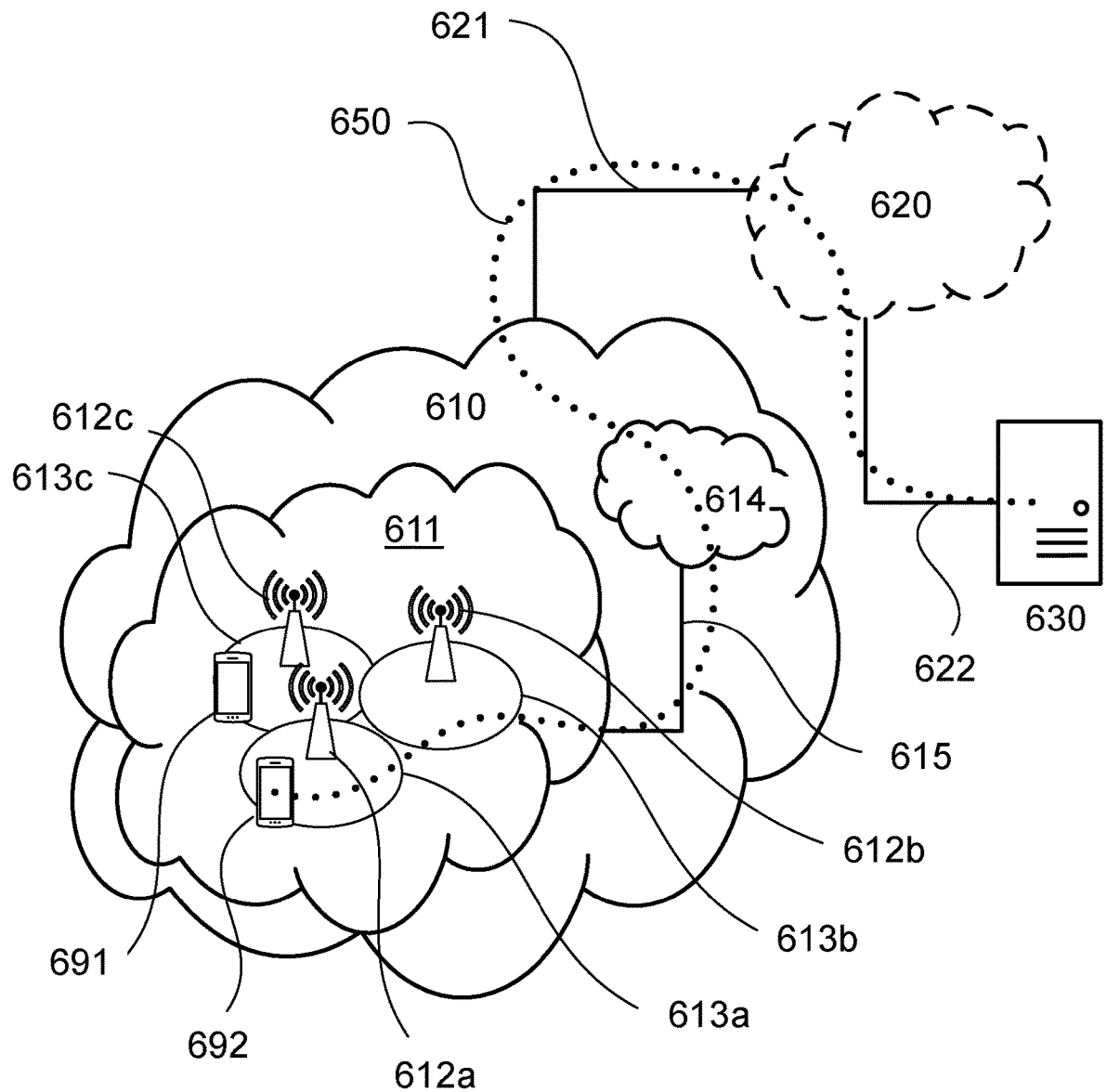
FIG. 8 illustrates a telecommunication network connected via an intermediate network to a host computer, according to certain embodiments.

FIG. 8 illustrates a telecommunication network connected via an intermediate network to a host computer, in accordance with some embodiments.

With reference to FIG. 8, in accordance with an embodiment, a communication system includes telecommunication network 610, such as a 3GPP-type cellular network, which comprises access network 611, such as a radio access network, and core network 614. Access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to core network 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more sub-networks (not shown).

The communication system of FIG. 8 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Figure 9:
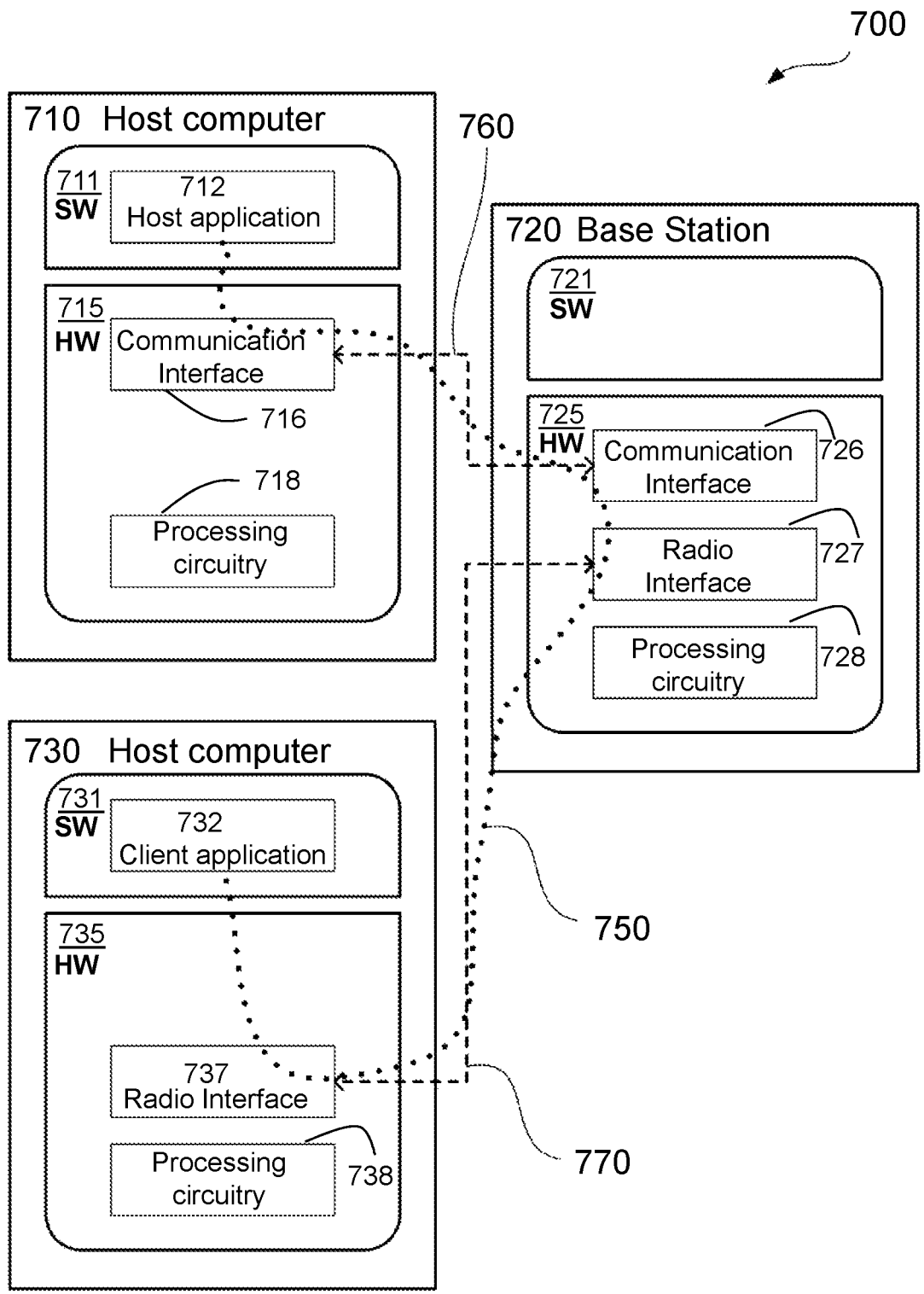
FIG. 9 illustrates a generalized block diagram of a host computer communicating via a base station with a user equipment over a partially wireless connection, according to certain embodiments.

FIG. 9 illustrates a host computer communicating via a base station with a user equipment over a partially wireless connection, in accordance with some embodiments.

Example implementations, in accordance with an embodiment, of the UE, base station and host computer discussed in the preceding paragraphs will now be described with reference to FIG. 9. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 9) served by base station 720. Communication interface 726 may be configured to facilitate connection 760 to host computer 710. Connection 760 may be direct or it may pass through a core network (not shown in FIG. 9) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

It is noted that host computer 710, base station 720 and UE 730 illustrated in FIG. 9 may be similar or identical to host computer 630, one of base stations 612a, 612b, 612c and one of UEs 691, 692 of FIG. 6, respectively. This is to say, the inner workings of these entities may be as shown in FIG. 9 and independently, the surrounding network topology may be that of FIG. 6.

In FIG. 9, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve the cell reselection procedures and thereby provide benefits such as higher bitrate and reduced ping pong effects.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figures 10, 11:
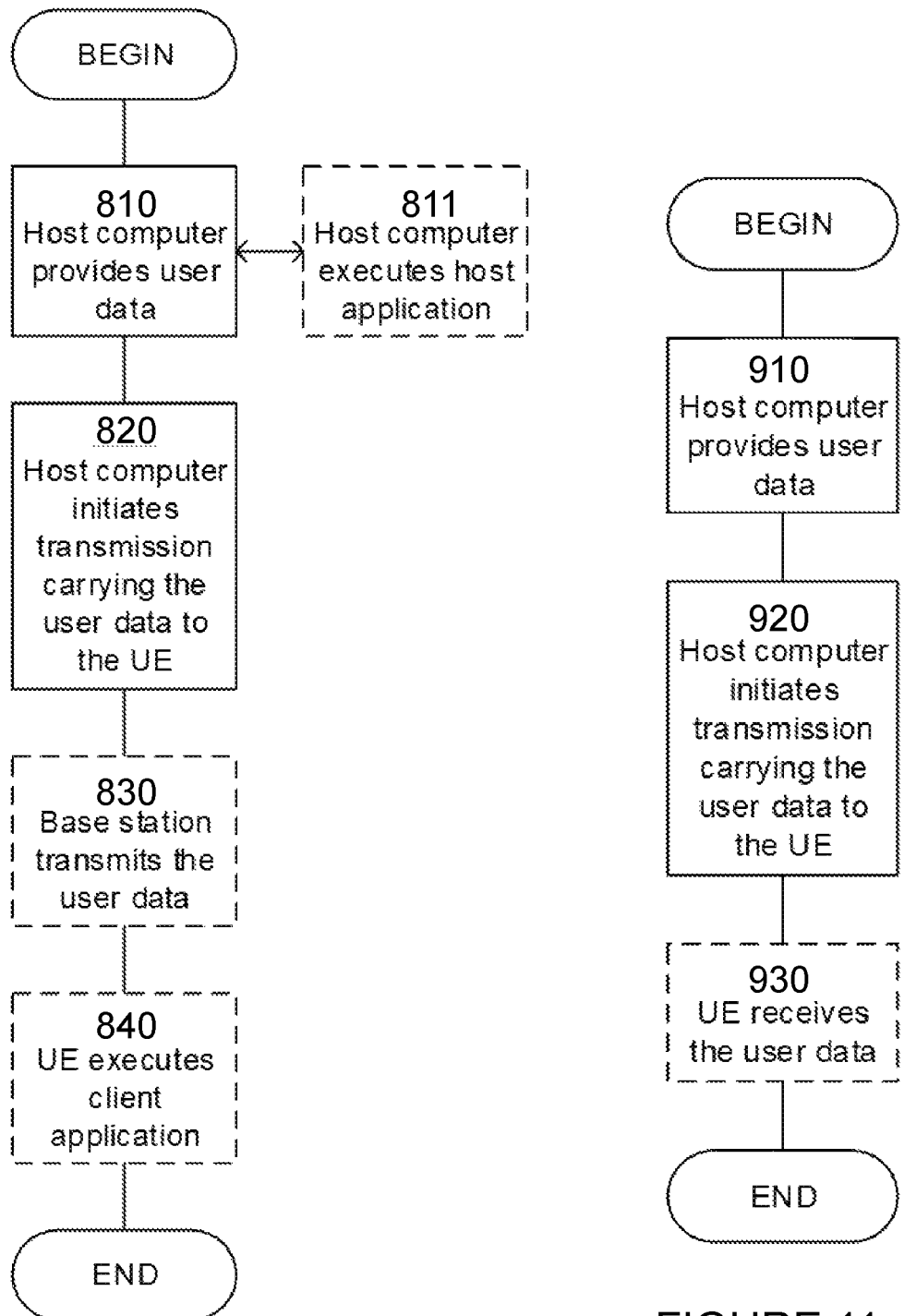
FIG. 10 illustrates a method implemented in a communication system, according to one embodiment.
FIG. 11 illustrates another method implemented in a communication system, according to one embodiment.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figures 12, 13:
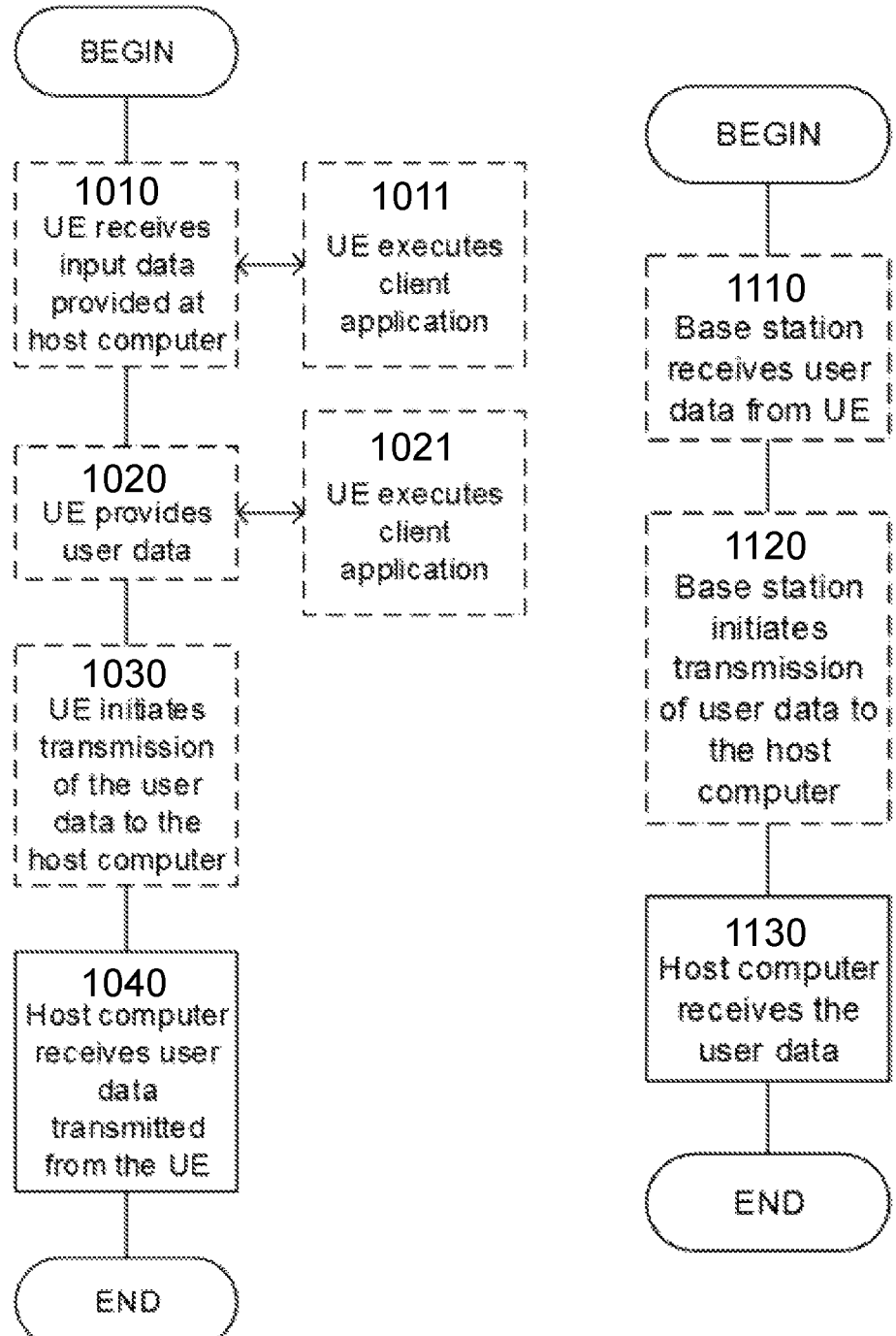
FIG. 12 illustrates another method implemented in a communication system, according to one embodiment.
FIG. 13 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in sub step 1230 (which may be optional), transmission of the user data to the host computer. In step 1240 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Figure 14:
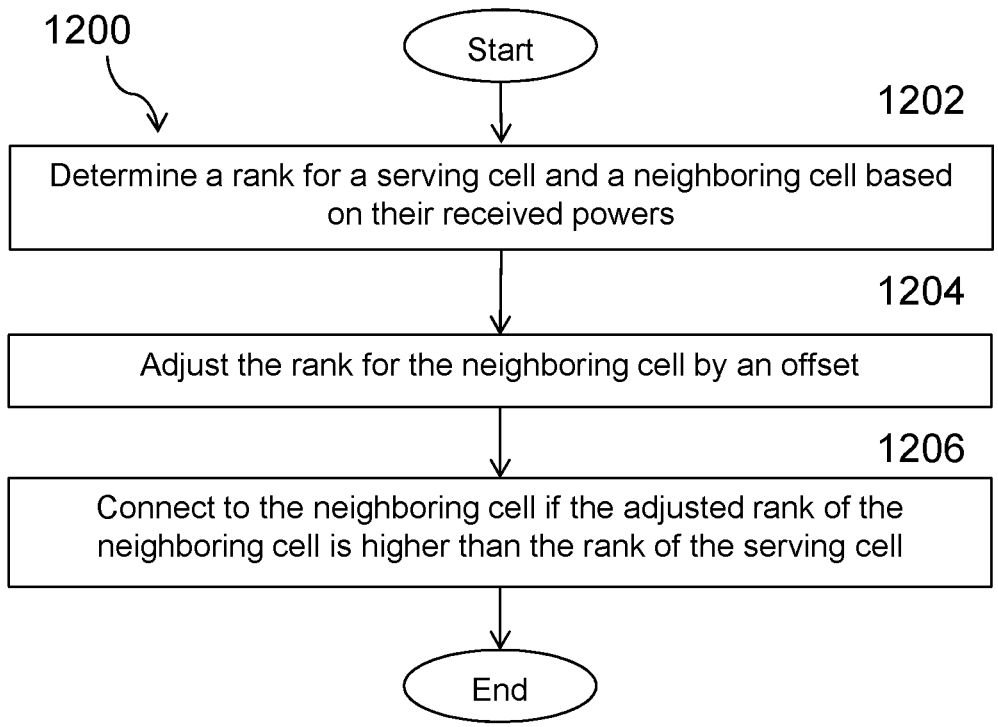
FIG. 14 illustrates an example method by a wireless device for cell reselection, according to certain embodiments.

FIG. 14 depicts a method 1200 in accordance with particular embodiments, the method begins at step 1202 with determining a rank for a serving cell and a neighboring cell based on their received powers. In step 1204, the rank for the neighboring cell is adjusted by an offset. In step 1206, if the adjusted rank of the neighboring cell is higher than the rank of the serving cell, a connection is established with the neighboring cell.

Figure 15:
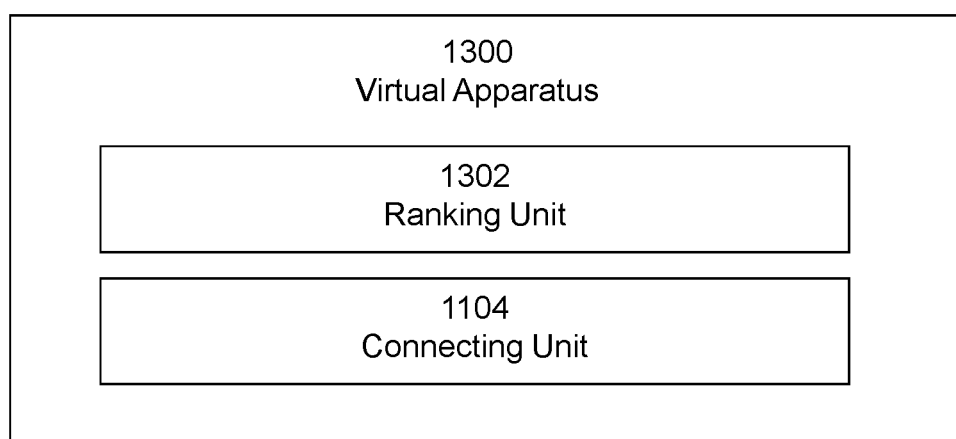
FIG. 15 illustrates an exemplary virtual computing device for cell reselection, according to certain embodiments.

FIG. 15 illustrates a schematic block diagram of an apparatus 1300 in a wireless network (for example, the wireless network shown in FIG. 3). The apparatus may be implemented in a wireless device or network node (e.g., wireless device 310 or network node 360 shown in FIG. 3). Apparatus 1300 is operable to carry out the example method described with reference to FIG. 14 and possibly any other processes or methods disclosed herein. It is also to be understood that the method of FIG. 14 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause ranking unit 1302 and connecting unit 1304, and any other suitable units of apparatus 1300 to perform corresponding functions according one or more embodiments of the present disclosure.

As illustrated in FIG. 15, apparatus 1300 includes ranking unit 1302 and connecting unit 1304. Ranking unit 1302 is configured to rank a serving cell and a neighboring cell based on their received powers. Ranking unit 1302 is further configured to adjust the rank for the neighboring cell by an offset. Connecting unit 1304 is configured to connect to the neighboring cell if the adjusted rank of the neighboring cell is higher than the rank of the serving cell.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 16:
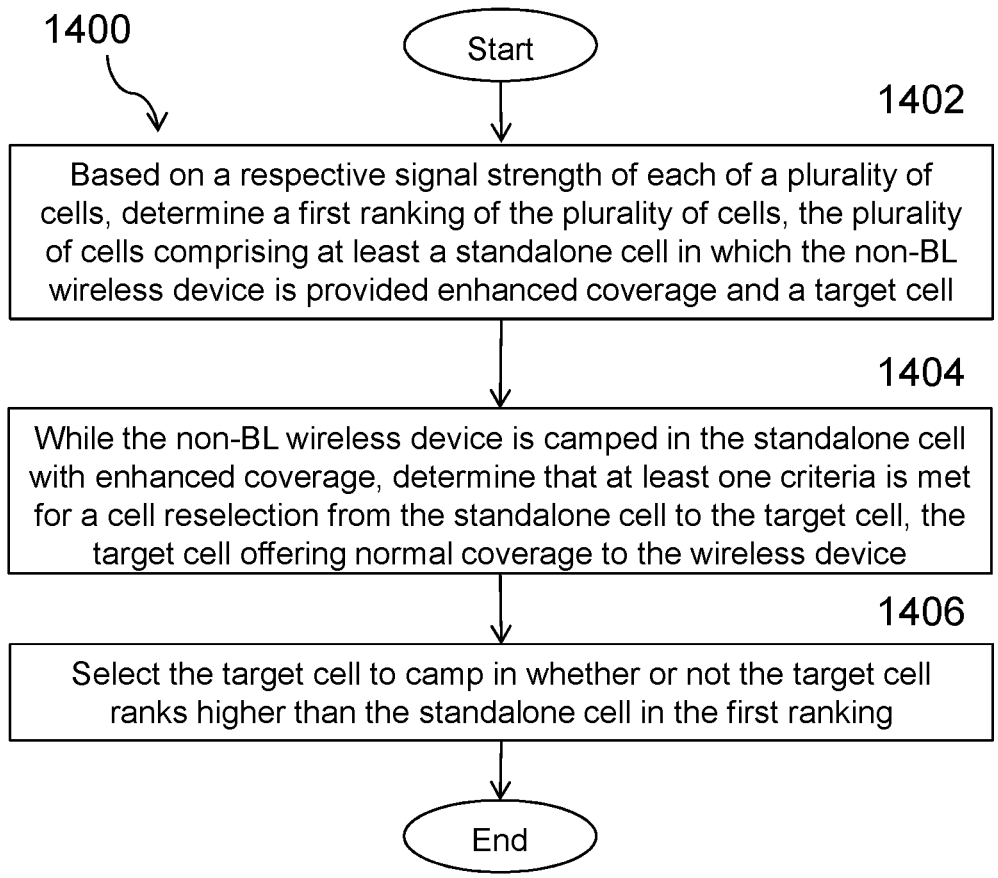
FIG. 16 illustrates another example method by a wireless device for cell reselection, according to certain embodiments.

FIG. 16 depicts a method 1400 for cell reselection by a wireless device 310 camped in a standalone cell providing enhanced coverage to the wireless device 310. The wireless device 310 may include a non-BL wireless device.

At step 1402, based on a respective signal strength of each of a plurality of cells, the wireless device 310 determines a first ranking of the plurality of cells. The plurality of cells include at least the standalone cell and a target cell.

While the non-BL wireless device is camped in the standalone cell with enhanced coverage, the non-BL wireless device determines that at least one criteria is met for a cell reselection from the standalone cell to the target cell, at step 1404. The target cell is offering normal coverage to the non-BL wireless device.

At step 1406, the non-BL wireless device selects the target cell to camp in whether or not the target cell ranks higher than the standalone cell in the first ranking.

In a particular embodiment, the at least one criteria comprises at least one S-Criterion.

In a particular embodiment, determining that at least one criteria is met includes obtaining at least one of a signal quality measurement and a signal strength measurement for the target cell and determining that the at least one of the signal quality measurement and the signal strength measurement for the target cell is greater than at least one threshold.

In a particular embodiment, determining that at least one criteria is met includes obtaining at least one of a signal quality measurement and a signal strength measurement for the target cell and determining that the at least one of the signal quality measurement and the signal strength measurement for the target cell is greater than at least one threshold by at least a margin.

In a particular embodiment, selecting the target cell to camp in includes applying at least one offset to increase a rank of the target cell offering normal coverage relative to a rank of the standalone cell providing enhanced coverage in the ranking and selecting the target cell to camp in based on the ranking.

In a particular embodiment, the non-BL wireless device 310 receives, from a network node 360 associated with the standalone cell, a signal comprising the at least one offset. In a further particular embodiment, the at least one offset is received with System Information. In another particular embodiment, the at least one offset is received as broadcast information.

In a further particular embodiment, the at least one offset comprises a plurality of offsets, and each of the plurality of offsets being associated with a respective one of a plurality of cells neighboring the standalone cell. In a further particular embodiment, each of the plurality of offsets is equal.

In a particular embodiment, the first ranking includes at least one additional target cell. In a particular embodiment, the non-BL wireless device 310 applies at least one offset associated with the at least one additional target cell to increase a rank of the at least one additional target cell in the first ranking relative to the rank of the standalone cell in the first ranking. In a further particular embodiment, based on the at least one additional target cell offering only extended coverage to the non-BL wireless device, the non-BL wireless device 310 determines to omit the at least one additional target cell from the first ranking.

In a particular embodiment, the signal quality measurement includes a RSRQ measurement and the signal strength measurement includes a RSRP measurement.

In a particular embodiment, after camping in the target cell, the non-BL wireless device 310 may determine that at least one criteria is met for cell reselection back to the standalone cell from the target cell. The non-BL wireless device 310 may determine that only extended coverage is available in the standalone cell and determine to remain camped in the target cell.

Figure 17:
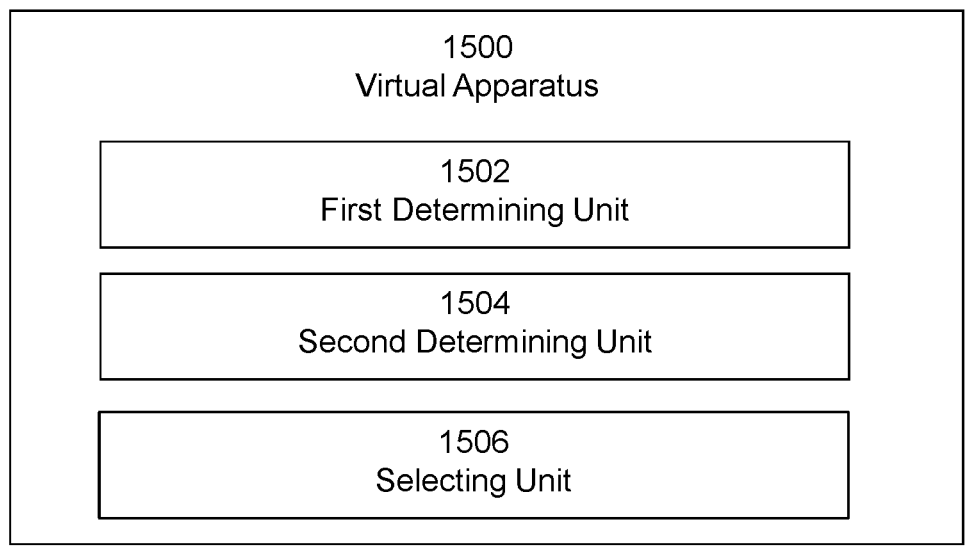
FIG. 17 illustrates another exemplary virtual computing device for cell reselection, according to certain embodiments.

FIG. 17 illustrates a schematic block diagram of an apparatus 1500 in a wireless network (for example, the wireless network shown in FIG. 3). The apparatus may be implemented in a wireless device or network node (e.g., wireless device 310 or network node 360 shown in FIG. 3). Apparatus 1500 is operable to carry out the example method described with reference to FIG. 16 and possibly any other processes or methods disclosed herein. It is also to be understood that the method of FIG. 16 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first determining unit 1502, second determining unit 1504, selecting unit 1506, and any other suitable units of apparatus 1500 to perform corresponding functions according one or more embodiments of the present disclosure.

As illustrated in FIG. 17, apparatus 1500 includes first determining unit 1502, second determining unit 1504, and selecting unit 1506 and may be associated with a non-BL wireless device camped in a standalone cell providing enhanced coverage to the non-BL wireless device.

According to certain embodiments, first determining unit 1502 is configured to perform certain of the determining functions of apparatus 1500. For example, first determining unit 1502 may, based on a respective signal strength of each of a plurality of cells, determine a first ranking of the plurality of cells. The plurality of cells include at least the standalone cell and a target cell.

According to certain embodiments, second determining unit 1504 is configured to perform certain other of the determining functions of apparatus 1500. For example, while the non-BL wireless device is camped in the standalone cell with enhanced coverage, second determining unit 1504 may determine that at least one criteria is met for a cell reselection from the standalone cell to the target cell. The target cell is offering normal coverage to the non-BL wireless device.

According to certain embodiments, selecting unit 1504 is configured to perform certain of the selecting functions of apparatus 1500. For example, selecting unit 1506 may select the target cell to camp in whether or not the target cell ranks higher than the standalone cell in the first ranking.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 18:
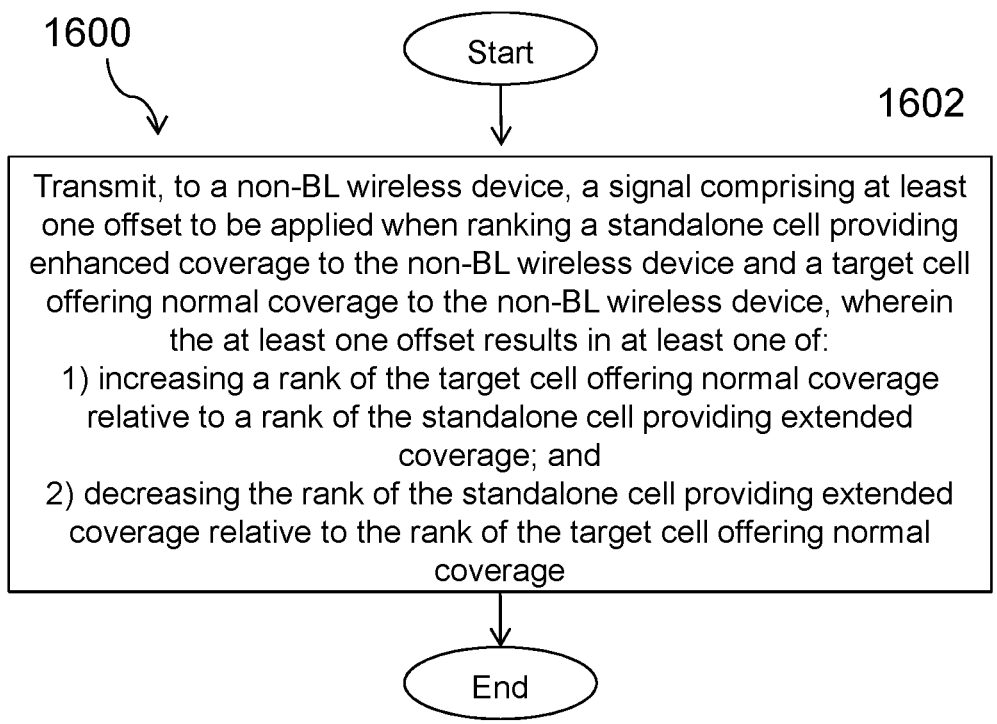
FIG. 18 illustrates an example method by a network node for configuring a wireless device for cell reselection, according to certain embodiments.

FIG. 18 depicts a method 1600 by a network node 360 serving a non-BL wireless device with extended coverage in a standalone cell. At step 1602, the network node 360 transmits, to the non-BL wireless device, a signal comprising at least one offset to be applied when ranking a plurality of cells for selecting a cell to camp in. The plurality of cells include the standalone cell in which the non-BL wireless device is camped with extended coverage, and a target cell offering normal coverage to the non-BL wireless device. The at least one offset results in at least one of: increasing a rank of the target cell offering normal coverage to the non-BL wireless device relative to a rank of the standalone cell providing extended coverage, and decreasing the rank of the standalone cell providing extended coverage relative to the rank of the target cell offering normal coverage.

In a particular embodiment, the at least one offset is transmitted with System Information.

In a particular embodiment, the at least one offset is transmitted as broadcast information.

In a particular embodiment, the at least one offset includes a plurality of offsets, and each of the plurality of offsets being associated with a respective one of a plurality of cells neighboring the standalone cell. The target cell is one of the plurality of cells neighboring the standalone cell. In a further particular embodiment, each of the plurality of offsets is equal.

In a particular embodiment, the ranking is based on a respective signal strength of each of the plurality of cells.

Figure 19:
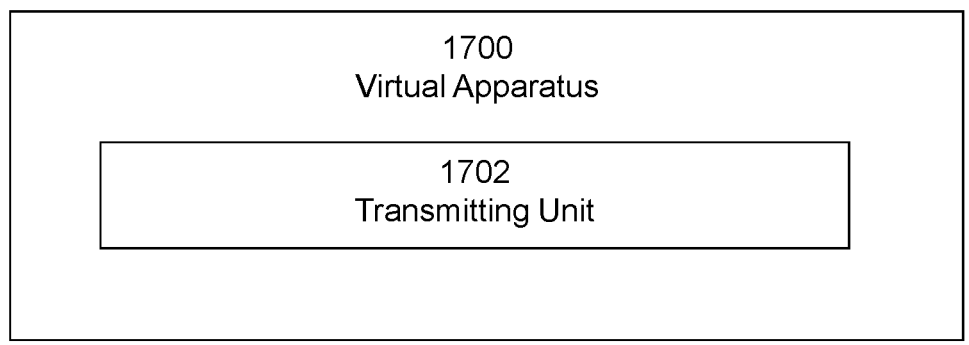
FIG. 19 illustrates a exemplary virtual computing device for configuring a wireless device for cell reselection, according to certain embodiments.

FIG. 19 illustrates a schematic block diagram of an apparatus 1700 in a wireless network (for example, the wireless network shown in FIG. 3). The apparatus may be implemented in a wireless device or network node (e.g., wireless device 310 or network node 360 shown in FIG. 3). Apparatus 1700 is operable to carry out the example method described with reference to FIG. 18 and possibly any other processes or methods disclosed herein. It is also to be understood that the method of FIG. 18 is not necessarily carried out solely by apparatus 1700. At least some operations of the method can be performed by one or more other entities.

Virtual Apparatus 100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 1702 to perform corresponding functions according one or more embodiments of the present disclosure.

As illustrated in FIG. 19, apparatus 1700 includes transmitting unit 1702 and is associated with a network node 360 serving a non-BL wireless device with extended coverage in a standalone cell.

According to certain embodiments, transmitting unit 1702 is configured to perform certain of the transmitting functions of apparatus 1700. For example, transmitting unit 1702 may be configured to transmit, to a non-BL wireless device, a signal comprising at least one offset to be applied when ranking a plurality of cells for selecting a cell to camp in. The plurality of cells include the standalone cell in which the non-BL wireless device is camped with extended coverage, and a target cell offering normal coverage to the non-BL wireless device. The at least one offset results in at least one of: increasing a rank of the target cell offering normal coverage to the non-BL wireless device relative to a rank of the standalone cell providing extended coverage, and decreasing the rank of the standalone cell providing extended coverage relative to the rank of the target cell offering normal coverage.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 20:
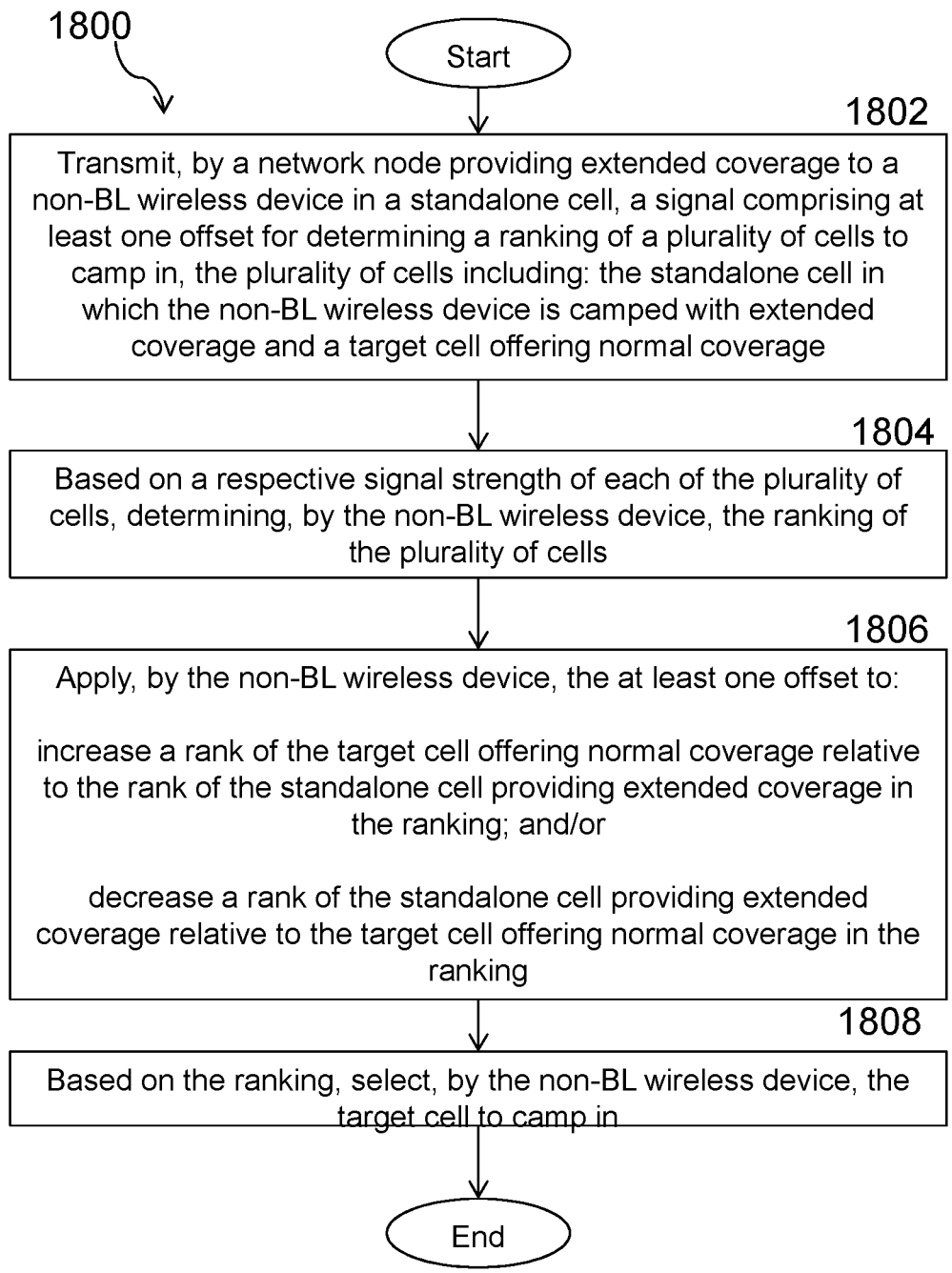
FIG. 20 illustrates an example method by a network node serving a wireless device with extended coverage in a serving cell, according to certain embodiments.

FIG. 20 depicts a method 1800 for cell reselection, according to certain embodiments. The method begins at step 1802 when a network node 360 providing extended coverage to a non-BL wireless device in a standalone cell transmits a signal to the non-BL wireless device. The signal comprises at least one offset for determining a ranking of a plurality of cells to camp in. The plurality of cells include the standalone cell in which the non-BL wireless device is camped with extended coverage and a target cell offering normal coverage to the non-BL wireless device.

Based on a respective signal strength of each of the plurality of cells, the non-BL wireless device determines the ranking of the plurality of cells, at step 1804.

At step 1806, the non-BL wireless device applies the at least one offset to increase a rank of the target cell offering normal coverage relative to a rank of the standalone cell providing extended coverage in the ranking and/or decrease a rank of the standalone cell providing extended coverage relative to the target cell offering normal coverage in the ranking.

Based on the ranking, the non-BL wireless device selects the target cell to camp in, at step 1808.

EXAMPLE EMBODIMENTS

Example Embodiment 1. A method performed by a wireless device for cell reselection includes: measuring a received power for a serving cell of the wireless device; measuring a received power for a neighboring cell; determining a rank for the serving cell based on the received power for the serving cell; determining a rank for the neighboring cell based on the received power for the neighboring cell; adding an offset to the rank for the neighboring cell to produce an offset rank; and connecting to the neighboring cell based on the offset rank and the rank for the serving cell.

Example Embodiment 2. The method of example embodiment 1 further comprising the step of adding a second offset to the rank for the serving cell.

Example Embodiment 3. The method of any of the previous embodiments, further comprising: providing user data; and forwarding the user data to a host computer via the transmission to the base station.

Example Embodiment 4. A method performed by a base station for cell reselection, the method comprising: communicating an offset to a wireless device; and receiving a request to connect to a neighboring cell if a rank for a serving cell of the wireless device is lower than a rank for the neighboring cell adjusted by the offset.

Example Embodiment 5. The method of example embodiment 4, further comprising communicating a second offset to the wireless device and receiving a request to connect to the serving cell if the rank for the serving cell adjusted by the second offset is higher than the rank of the neighboring cell.

Example Embodiment 6. The method of any of the previous embodiments, further comprising: obtaining user data; and forwarding the user data to a host computer or a wireless device.

Example Embodiment 7. A wireless device for cell reselection, the wireless device comprising: processing circuitry configured to perform any of the steps of any example embodiments 1 to 3; and power supply circuitry configured to supply power to the wireless device.

Example Embodiment 8. A base station for cell reselection, the base station comprising: processing circuitry configured to perform any of the steps of any of example embodiments 4 to 6; and power supply circuitry configured to supply power to the wireless device.

The invention claimed is:

1. A method for cell reselection by a non-Bandwidth reduced Low complexity (non-BL) wireless device, the non-BL wireless device camped in a standalone cell providing enhanced coverage to the wireless device, the method comprising:
   based on a respective signal strength of each of a plurality of cells, determining a first ranking of the plurality of cells, the plurality of cells comprising at least the standalone cell and a target cell;
   while the non-BL wireless device is camped in the standalone cell with enhanced coverage, determining that at least one criteria is met for a cell reselection from the standalone cell to the target cell, the target cell offering normal coverage to the wireless device; and
   selecting the target cell to camp in whether or not the target cell ranks higher than the standalone cell in the first ranking.

2. The method of claim 1, wherein the at least one criteria comprises at least one S-Criterion.

3. The method of claim 1, wherein determining that at least one criteria is met comprises:
   obtaining at least one of a signal quality measurement and a signal strength measurement for the target cell; and
   determining that the at least one of the signal quality measurement and the signal strength measurement for the target cell is greater than at least one threshold.

4. The method of claim 1, wherein selecting the target cell to camp in comprises:
   applying at least one offset to increase a rank of the target cell offering normal coverage relative to a rank of the standalone cell providing enhanced coverage in the ranking; and
   selecting the target cell to camp in based on the ranking.

5. The method of claim 1, after camping in the target cell, the method further comprises:
   determining that at least one criteria is met for cell reselection back to the standalone cell from the target cell;
   determining that only extended coverage is available for the non-BL wireless device in the standalone cell; and
   determining to remain camped in the target cell.

* * * * *